United States Patent [19]

Demar et al.

[11] Patent Number: 4,685,677

[45] Date of Patent: Aug. 11, 1987

[54] AUTOMATIC REPLAY CONTROL SYSTEM AND METHOD FOR AMUSEMENT DEVICES

[75] Inventors: Lawrence E. Demar, Chicago; Steven S. Ritchie, Evanston, both of Ill.

[73] Assignee: Williams Electronics, Inc., Chicago, Ill.

[21] Appl. No.: 884,362

[22] Filed: Jul. 11, 1986

[51] Int. Cl.[4] .......................... A63F 7/02; A63F 9/22
[52] U.S. Cl. ........................ 273/121 A; 273/138 A; 273/1 E
[58] Field of Search ............... 273/1 E, 1 GC, 1 GE, 273/85 G, 138 A, DIG. 28, 121 A, 313–316, 1 ES, 143 R; 364/410–412

[56] References Cited

U.S. PATENT DOCUMENTS

| 4,258,838 | 3/1981 | Rockola et al. | 273/138 A |
| 4,363,485 | 12/1982 | Edwall | 273/121 A |
| 4,366,960 | 1/1983 | Bromley et al. | 273/85 G |
| 4,650,190 | 3/1987 | Geiger | 273/110 |

*Primary Examiner*—Leo P. Picard
*Assistant Examiner*—MaryAnn Stoll Lastova
*Attorney, Agent, or Firm*—Jones, Day, Reavis & Pogue

[57] ABSTRACT

A microprocessor computer system includes random access and read only memories and a set of operator switches permitting the storage of game play information. During operation of the amusement device, game play is monitored and the score required to receive a free play is periodically adjusted to maintain a selected free play percentage. The percentage is determined by either the factory setting or the operator through the operator switches. The data used to compute the free play percentage is constantly checked by the system to insure that it is valid.

9 Claims, 11 Drawing Figures

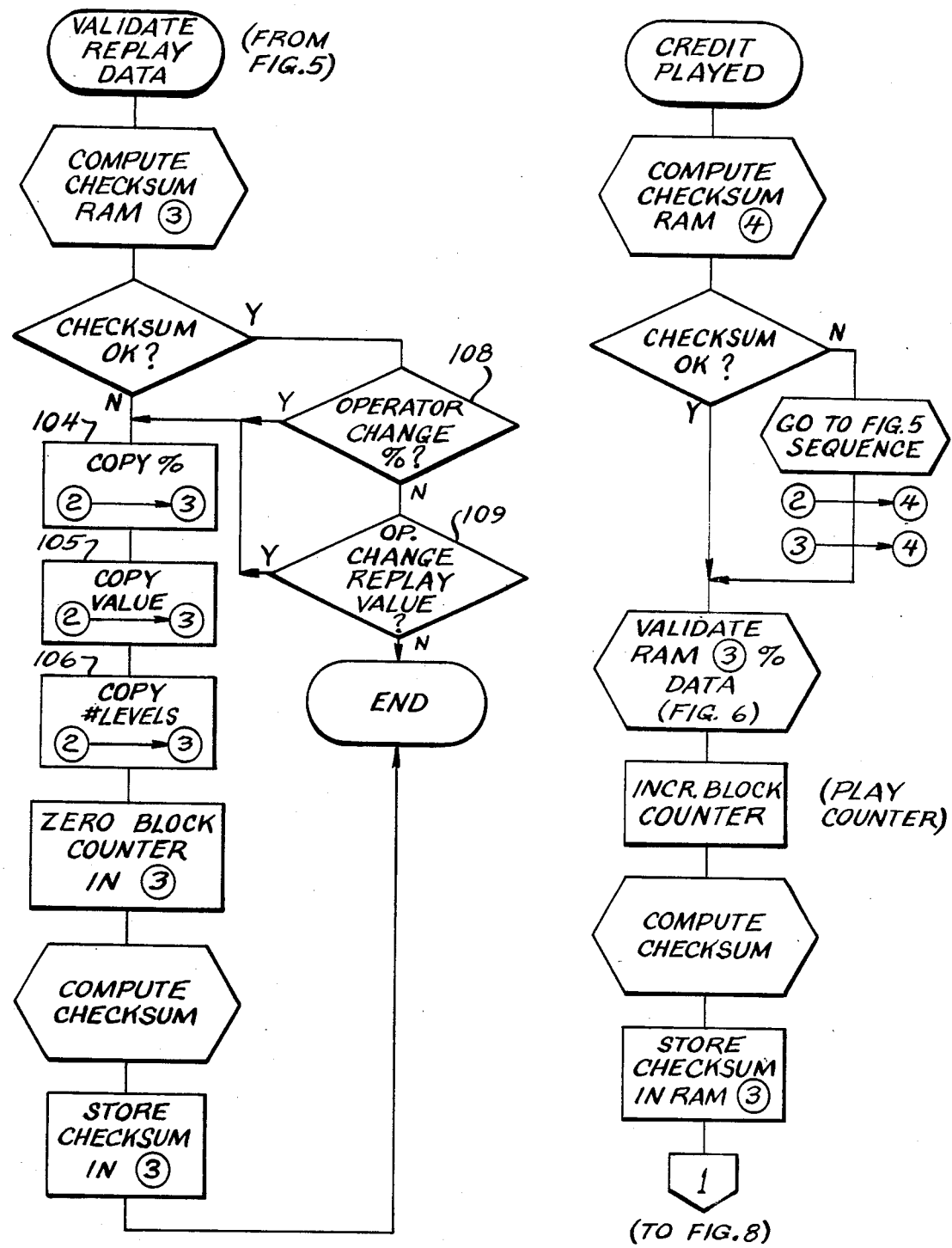
*FIG. 6*  *FIG. 7*

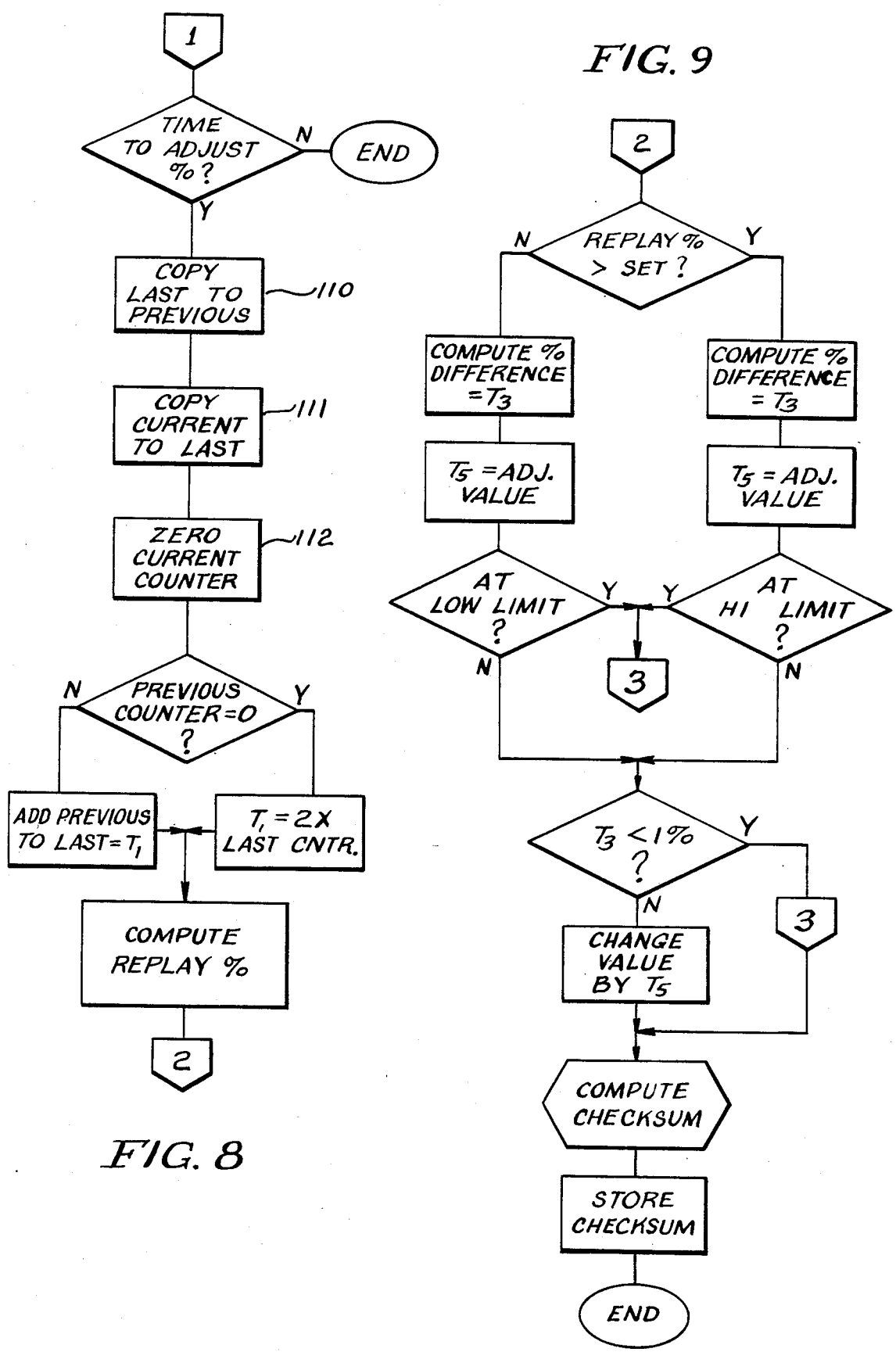

4,685,677

AUTOMATIC REPLAY CONTROL SYSTEM AND METHOD FOR AMUSEMENT DEVICES

BACKGROUND OF THE INVENTION

This invention relates to coin operated amusement devices, such as pinball machines, video games and the like. More specifically, it relates to the commercial type of device usually found in game arcades, restaurants and other commercial establishments. Such devices usually include a computer control system which, responsive to player inputs, operates the game. Typically the control system will detect switch closures caused by hitting targets, etc., and responsive thereto update player scores and award replays (free games). The computer control system usually includes a microprocessor, associated memory and interface devices for connecting the processor system to the switches, lights, solenoids and other associated devices (including, in the case of video games, a CRT).

While such devices are resonably satisfactory, there is a desire to maintain the game as competitive as possible at each particular establishment. Thus, for example, in an arcade where the players are reasonably skilled, it is necessary to increase the number of points required to obtain a free game to make it a challenge and to insure a resonable return on investment. Conversely, when a game is first introduced or in low traffic locations where players are not highly skilled, it is necessary that the free game award level be set relatively low to encourage players.

The importance of correctly setting the replay level (often known in the trade as "percentaging" because it is measured as the ratio of free games to total games played) cannot be over emphasized. A game which produces a good revenue stream at one location where it is properly percentaged may earn next-to-nothing at another location due to the operator's failure to properly match the free play award level to the skill of the game players.

A complicating factor arises from the constantly changing skill level of the players. Thus, while the free play percentage initially may be correct, it may become too low during a subsequent time period or, if the operator overcompensates, raised excessively high that game players lose interest because they are unable to achieve the indicated awards.

Typically the free play award percentage is set by either of two methods. When a game is first delivered to a commercial establishment, it is provided with factory settings which, at best, are a compromise designed to encourage initial play of the game by liberally awarding free plays. As skill level increases excessive free plays are obtained leading to a loss in revenue and challenge which is, of course, undesirable. To accommodate this most coin operated amusement devices permit the operator to manually change the free play award levels in an effort to compensate for the player's learning curve. As indicated, manually changing the values is, at best, a guess.

It would be desirable to provide a computer control system which could automatically monitor the skill level of the players of a particular game and periodically adjust the free play award level to maintain optimum interest in the game and thereby to maximize revenue. Such an arrangement would reduce or eliminate operator error and automatically adjust game play for changes in skill level as, for example, when the game is moved from one commercial establishment to another or when a new set of players begin to play the game. Such a device would eliminate the need for operator estimation and could more fairly control the award of free play credits.

It is accordingly an object of the present invention to provide such an automatic control system for a coin operated device which can monitor and automatically adjust the percentage of free games awarded.

It is a further object of the invention to provide a comprehensive control system which can monitor game play, validate game play data and periodically adjust the award levels when valid data is available.

It is a further object of the invention to provide a control system which, if desired, can be manually operated rather than automatically controlled.

A further object of the invention is to provide an automatic control system which lets the operator select the percentage of replays to be awarded and then adjusts the point values required for free play as necessary to achieve the desired percentage.

Other objects and advantages of the invention will be apparent from the remaining portion of the specification.

BRIEF DESCRIPTION OF THE DRAWINGS

FIGS. 4 through 11 are flow diagrams useful in explaining the operation of the invention.

SUMMARY OF THE INVENTION

An automatic control system is provided which not only operates an amusement device but also maintains statistical data, such as the total number of plays and the number of free games awarded. From either factory settings or operator inputs the data is periodically manipulated to determine the percentage of free games awarded during a block (a block being a selected number of games such as five hundred games). If the control system detects that the percentage of free games awarded is above or below the desired setting, the number of points required to obtain a free game is adjusted accordingly in an effort to obtain the desired percentage. Thus, regardless of the skill level of the players, the game will, over a period of time, award the desired percentage of free games thereby maximizing interest in the game.

To deal with the possibility that the game has been moved, data has been lost or that the system is malfunctioning, the invention repeatedly checks the data to insure that it is valid before adjusting the free play percentage. In the event that invalid data is detected, either no change is made in the existing percentage or the permanently stored factory settings are reverted to.

DETAILED DESCRIPTION

Figure 1:
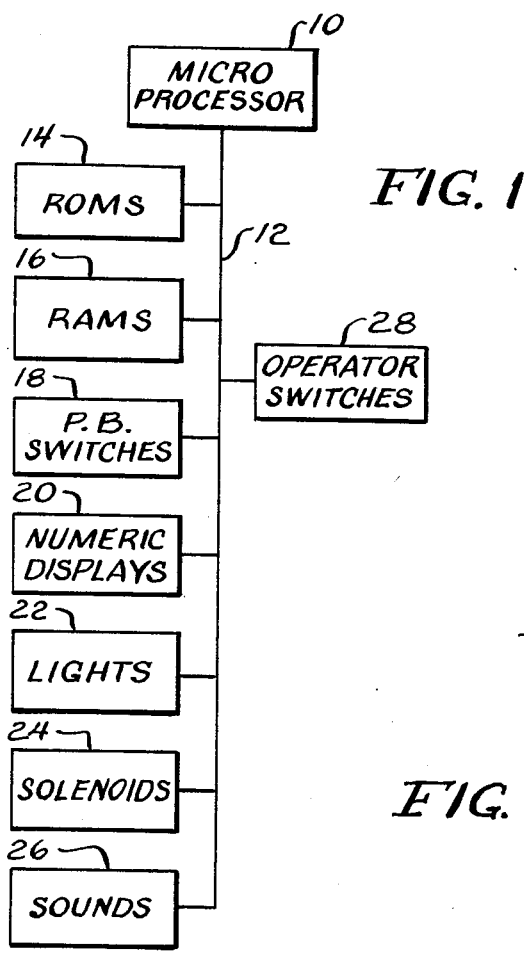
FIG. 1 is a block diagram of a computer control system forming a part of the present invention.

Referring to FIG. 1, there is disclosed a typical microprocessor system for use in a coin operated amusment device, such as a pinball machine or video game. There are many microprocessor systems that can be used for this purpose as, for example, the Motorola 6800 series. The microprocessor 10 is interfaced via a bus 12 to various memory elements including one or more ROMs 14 (read only memories), RAMs 16 (random access memories), playfield switches 18 (in the case of pinball machines), numeric displays 20, lights 22, solenoids 24 and sound circuits 26. In addition, a set of operator switches 28 are usually provided for the purpose of permitting the operator (game owner or owner of the establishment in which the game is located) to input information to the system, such as the number of free play levels, the point values required for each free play level and to obtain data from the processor system, such as revenue received, number of games played, and test information concerning the operational conditions of the amusement device.

The memories are connected directly to the bus 12 in a manner well known by those skilled in the art. Typically the remaining devices, such as switches, displays, lights, etc., are connected to the processor bus by means of an interface device such as a PIA (peripheral interface adapter). Such device lets the processor communicate with the various elements, for example, to interrogate a switch matrix to detect closures or to operate numerical displays to display player scores.

Figure 2:
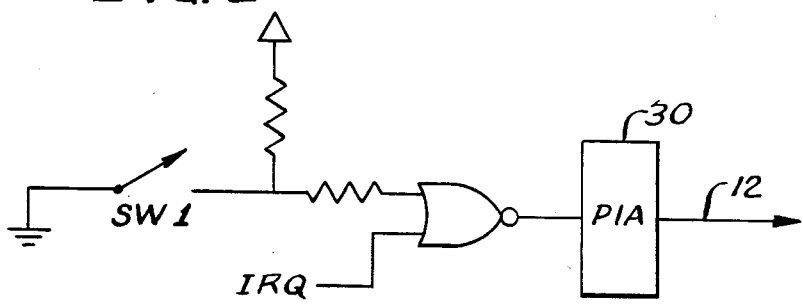
FIG. 2 is a schematic illustrating the manner in which the operator inputs data to the control system of FIG. 1.

Referring to FIG. 2, a typical arrangement for the operator switches 28 is illustrated. In the present invention the FIG. 2 circuit permits the operator to provide certain information to the control system and to obtain data therefrom. The operator switches, such as switch SW1, are usually located in a locked portion of the game not accessible by the game players. SW1 is connected through appropriate level and logic circuitry to a PIA 30 which, in turn, interfaces with the microprocessor via the bus 12. Additional operator switches may be provided as necessary. Such operator switches and their operation are well known in the art and will not be described in detail here. Basically the operator activates the switches in a specified sequence placing the system in a desired mode such as: test mode to check the circuitry; an accounting mode to check game play and revenue; or a setting mode in which manual replay levels and other game features may be selected, enabled or disabled.

Figure 3:
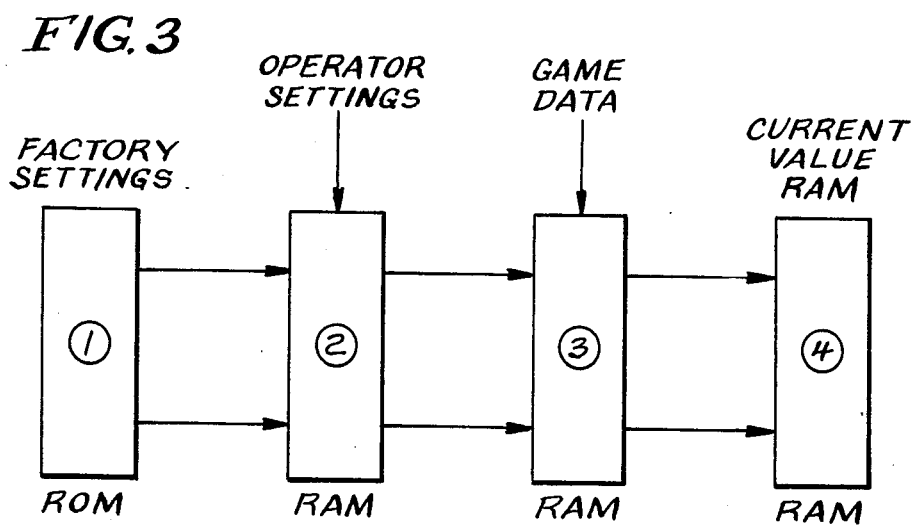
FIG. 3 is a diagram useful in explaining the movement of data from the various memory locations in the control system.

FIG. 3 is a diagram useful in understanding the operation of the present invention. It is a schematic representation of the way in which data is passed from one memory location to another during the operation of the automatic control system. Rather than constituting a discrete memory device, FIG. 3 represents locations within a specified type of memory. Thus, for example, memory 1 represents the memory locations within ROM 14 containing the factory settings for replay percentage, replay value and the number of replay levels. Memory 2 represents memory locations in a battery backed up RAM in which the operator selected adjustment information settings (and the factory default settings) are stored. Memory 3 represents the memory locations in RAM where game data used for automatic percentaging is stored while memory 4 represents the RAM locations where current values are calculated and processed. As the detailed description of the invention proceeds, reference to FIG. 3 will enable the reader to understand the manner in which the control system operates.

The balance of this specification will describe a series of flow diagrams (FIGS. 4 through 11) which indicate the manner of operation of the control system according to the present invention. The flow diagrams can be implemented in many different program forms, the implementation depending upon the type of processor system employed. It will be readily apparent to those skilled in the art how to implement the function specified in the various flow diagrams for any specific computer system.

Factory Setting Sequence

Figure 4:
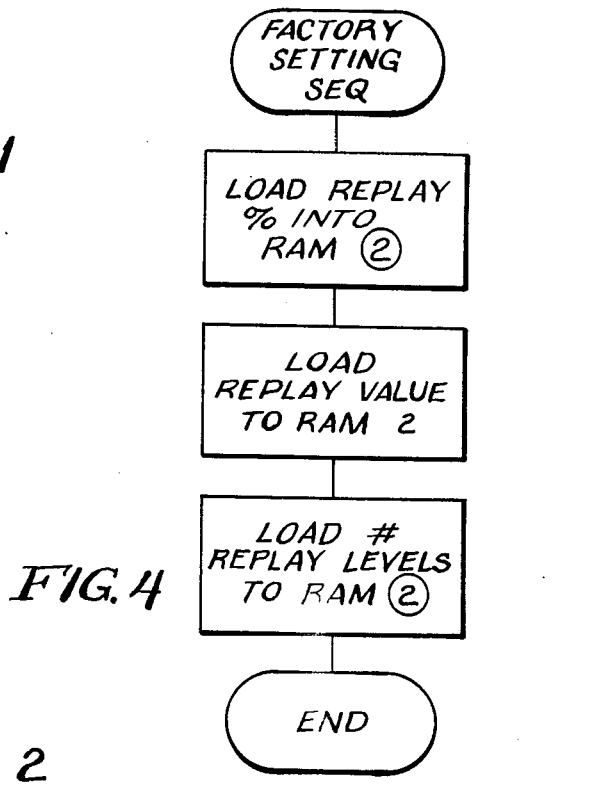

FIG. 4 illustrates the factory setting sequence which is called by the processor system whenever a game is first supplied with power, after power interruption in which battery backup has failed or when directed by the operator through the operator switches. The factory setting sequence transfers the factory settings permanently stored in the memory 1 into the memory locations 2 in the RAM. As shown in FIG. 4, this sequence loads a replay percentage, a starting replay value and the number of replay levels from memory 1 into memory 2. To exemplify the invention we will arbitrarily select values for these variables.

In the balance of this specification it will be assumed that the factory replay percentage is ten percent. That is, it is desired to award free plays in an amount approximately equal to ten percent of the number of games played. The replay value is the number of points which must be attained by a player to receive a free play. The factory setting is selected arbitrarily to approximate the desired replay percentage. For exemplification purposes it is assumed that the replay value is one million points.

The third variable is the number of replay levels. During a game a player can receive one or more free games as he reaches succeedingly higher point totals. Many amusement devices permit up to four levels of awards. Thus, a player would receive one free game at one million points, a second free game at two million points and so on. The number of replay levels is initially set at the factory at one but the operator may choose to provide two or more replay levels.

One additional variable should be discussed at this point. The percentage of free games awarded must be referenced to a selected number of games played. This is referred to as the block or block size. When the specified number of games have been played, the present invention examines the number of free games awarded as a percentage of the block size and adjusts, if necessary, the replay value in an effort to restore the selected replay percentage. For purposes of exemplifying the invention it will be assumed that the block size is five hundred games.

As indicated, whenever factory settings are required, the diagram in FIG. 4 is called whereby the factory settings are transferred from the permanent memory to the working memory.

Power Up Sequence

Figure 5:
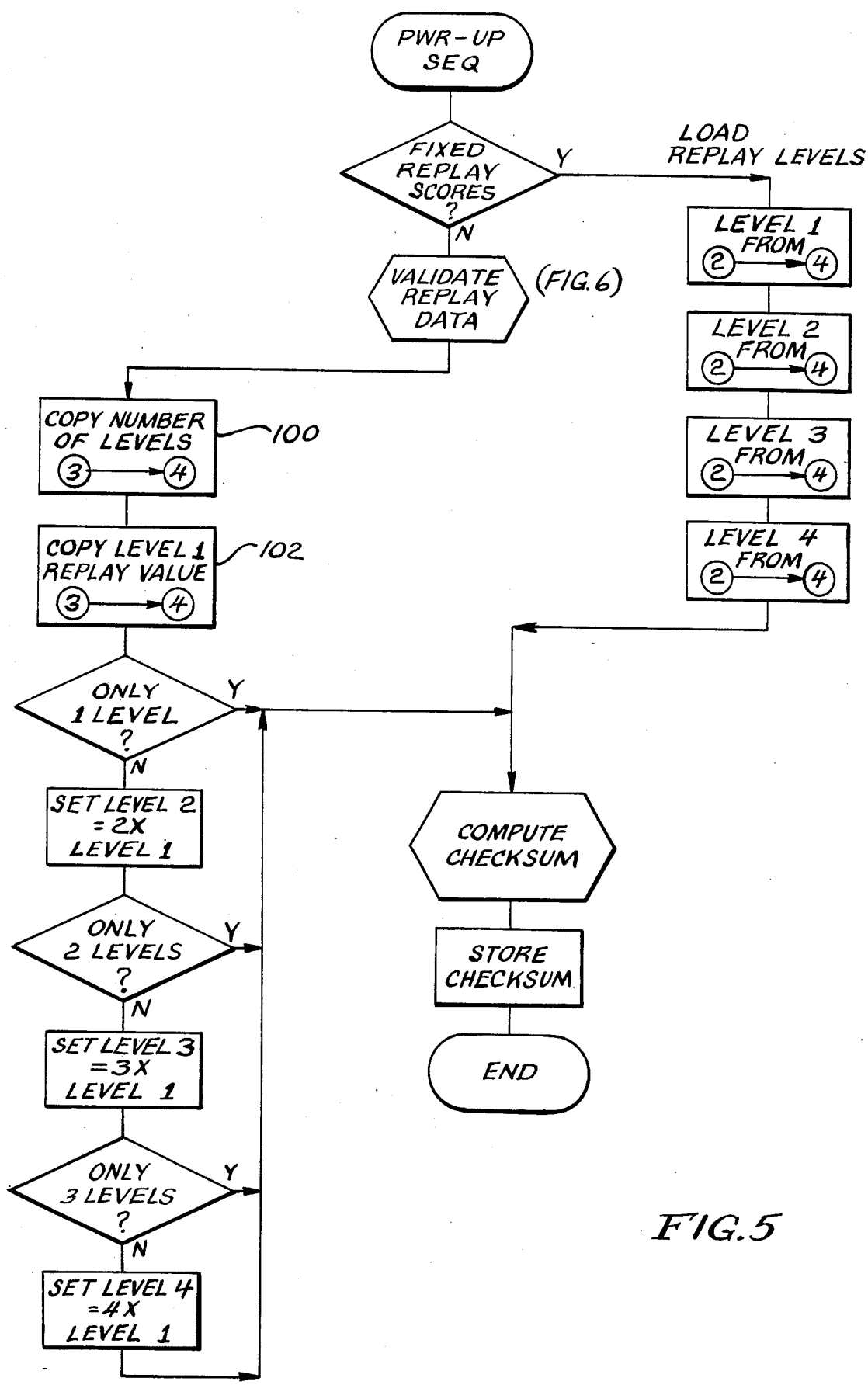

FIG. 5 illustrates the power up sequence in which the control system determines whether it is to automatically adjust replay percentages or it is to maintain fixed values as determined by the operator. If fixed replay scores are selected, the system merely copies the operator settings from memory 2 into memory 4, computes a check sum to insure the data is valid and exits this routine. Thus, whatever value the operator has specified for award levels 1 through 4 are copied into memory 4. If automatic percentaging is selected, the program first performs the functions specified in FIG. 6 to validate the existing data. This operation is described in connection with FIG. 6 under the heading Validate Replay Data. After valid data is provided to memory 3 the balance of the FIG. 5 routine is performed. This routine, at 100 and 102, copies the number of award levels and the replay value for level 1 from memory 3 to memory 4. The routine then determines how many levels the operator has selected and computes award level values for each additional level. In the automatic mode such additional award levels are multiples of the level one value (one million points). Finally, a check sum is computed and stored.

Validate Replay Data

FIG. 6 illustrates the sequence to be performed to validate the replay data as part of the power up sequence shown in FIG. 5. The check sum for memory 3 is computed and determines whether the data contained therein is valid. It will be recalled that memory 3 maintains the replay data based on the game adjustments from memory 2 and data acquired as games are played. Due to various untoward events this data may, on occasion, be invalid. If the check sum indicates that the data is faulty, the game adjustments for the replay percentage, starting value and number of levels are copied (at 104–106) from memory 2 into memory 3 thereby to provide valid data for future calculations. In that event it is necessary to zero the block counter contained in memory location 3. This prevents updating the replay until valid data has been received for at least one full block (500 gams). A new check sum is then computed and stored ending the FIG. 6 routine.

In the event that the check sum indicates valid data already exists in memory 3, the system checks (at 108–109) to determine if the operator, by means of the switches illustrated in FIG. 2, has indicated a desire to change either the replay percentage or replay value. If so, the routine branches back to the section which loads the new operator settings from memory 2 to memory 3. If not, the FIG. 6 routine is complete. After the power up sequence (and the validate data sequence) have been performed, the system is ready to interface with the game player to monitor game play and periodically to compute and adjust the replay percentage.

Credit Played

The FIG. 7 routine is called each time a game starts or another player is added to an existing game. It first computes a check sum on memory 4 to insure that the data is valid. If not, it branches to the FIG. 5 sequence resulting in new data being loaded from either memory 2 or memory 3 into memory location 4. Next the FIG. 6 routine is performed to re-validate the data contained in memory 3.

Assuming that the data is valid, FIG. 7 merely increments the block counter contained in memory 3 and a new check sum is computed and stored.

Adjust Percentage Routine

FIGS. 8 and 9 illustrate the adjustment routine which is entered from the FIG. 7 routine. As shown in FIG. 8, the program checks to see if it is time to adjust the replay percentage. This determination is accomplished by comparing the current value in the block counter with the selected block size (for example 500 games). If fewer than 500 games have been played since the last adjustment, the routine ends. If the block size has been reached, the routine updates three memory locations (110–112) maintained for purpose of "damping" changes in the replay value made by the system from one block to the next. Specifically, according to the present invention, the replay percentage is calculated over two blocks (1,000 games). That is, the replay percentage is adjusted every 500 games but, based upon statistics from the past two blocks.

Prior to adjusting the percentage the memory locations 110–112, in which the number of free games awarded in the current and previous two blocks are stored, are updated. Specifically, the block data is shifted so that the previous count is discarded, the last count becomes the previous count, the current count becomes the last count and the current count is set to zero.

After updating the replay counters, a check is made to determine if the previous count equals zero. This would occur the first time a block is reached when the game is new or after service or movement to a new location. In the event that the previous counter does equal zero, twice the value of the last count is used to compute the replay percentage. Otherwise the values stored in the previous counter and the last counter (representing the number of free games over the two blocks) are added together to create a value $T_1$ used to compute the replay percentage. The replay percentage is computed by dividing $T_1$ (the case of a 500 game block) by one thousand.

For example, if 45 free games were awarded during the last block and 55 free games awarded during the previous block, the total number of free games over a thousand games would be 100 or exactly ten percent. If the replay percentage were set at ten percent the circuit, as will be explained, would make no change in the current award level because the game was performing exactly as intended. If, however, the calculation yielded a percentage significantly different from the percentage set by the operator (or the factory setting), the routine shown in FIG. 9 automatically adjusts the award level in a manner designed to return the free play percentage to its selected value.

If the replay percentage is greater than the set value, the right branch of FIG. 9 is taken, otherwise the left branch. In either case the difference between the desired percentage and the computed percentage is determined and designated $T_3$. A value, $T_5$, is the adjustment value and, for example, may be one hundred thousand points. In the case of the right branch, $T_5$ would be a positive value, in the case of the left branch, a negative value. This value is used to increment or decrement, respectively, the current replay value required to receive a free game. Thus, for example, in the case of a one million point free game value, the system would increment or decrement that value by the $T_5$ value of one hundred thousand points.

Prior to adjusting the replay value, the system first checks to see if the replay value is at an upper or lower limit beyond which further adjustment is not permitted. This is a desirable safety feature to insure that in no case can the replay value move outside of certain predetermined ranges. If either limit has been reached, the program exits without altering the replay value after computing and storing a check sum. If the limit tests are negative, a check is then made to see if the computed difference, $T_3$, is less than one percent. If so, again no change made in the free play value as this is considered to be an acceptable variation from the desired replay percentage.

Finally, if in fact, a difference greater than the one percent is detected and the replay value is not at the upper or lower limit, a change in the replay value is effected by adding the value of $T_5$ the current replay value. In this way the system automatically compensates for the changing skill level of the game players to insure that, on average, the desired percentage of free games are awarded. Although the change is immediately made in memory 3, it will not be effective until the next power-up sequence when it is copied into memory 4. This insures a player will experience the same replay score from game to game.

Score Processing

Figures 10, 11:
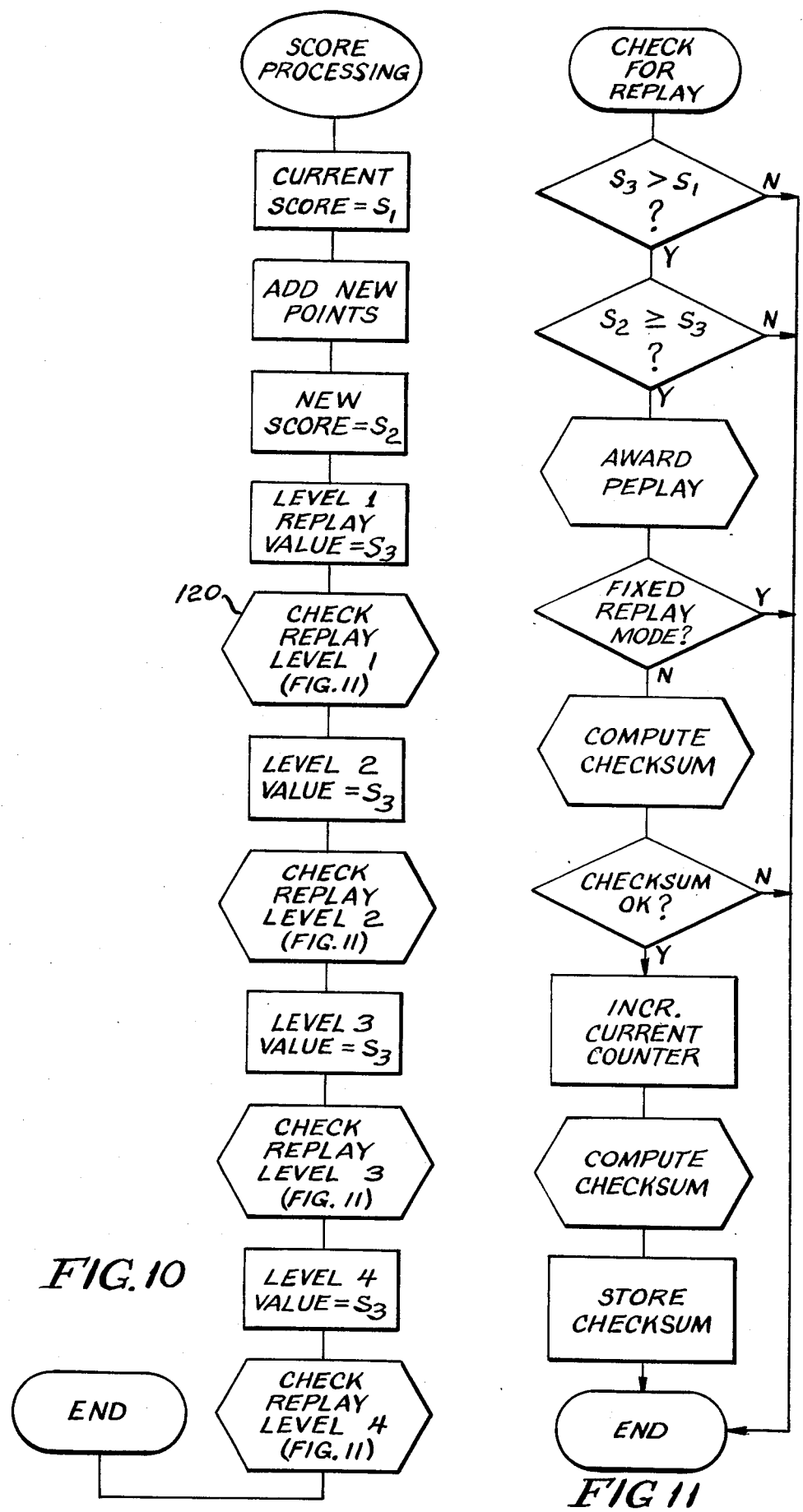

FIG. 10 illustrates the score processing routine which, in conjunction with FIG. 11, maintains the score and checks to see whether it is time to award a replay. The current score, S1, is stored in memory 4. When new points are obtained by the player, these are added to create a new score value S2. Each time the score processing routine is entered the relative values of S1, S2 and S3 are checked to determine if a replay award is called for as indicated at 120 in FIG. 10. At that time the routine diagrammed in FIG. 11 is called and performed. The FIG. 11 routine first determines if the value of S3 is greater than the value of S1. If not, this means that the player has already passed the award value for the current level of S3 and the routine ends.

Otherwise the routine next checks to see if the value S3 is greater than or equal to the award level S3. If not, it means the player has yet to achieve the replay value necessary. If so, the replay is awarded and, in the automatic mode, a check sum is computed and tested. If the check sum is correct, the current counter, which contains the number of free games awarded during a given block, is incemented, another check sum is computed and stored, and the routine returns to FIG. 10.

FIG. 11 is executed once for each replay level which has been enabled by the operator settings. If only one level is enabled, FIG. 11 is called once and then the FIG. 10 routine ends. Otherwise the same checks are made for each replay level and appropriate second, third and fourth level awards are made the first time the routines detect that the player's score has exceeded the appropriate value for the award.

From the foregoing description it will be apparent to those of ordinary skill in the art, that a control system for a coin operated amusement device has been developed which can closely monitor the skill level of game players utilizing the device and can adjust the number of free plays awarded to maximize enjoyment and revenue.

While I have shown and described embodiments of the invention, it will be understood that this description and illustrations are offered merely by way of example, and that the invention is to be limited in scope only as to the appended claims.

What is claimed is:

1. A control system for automatically regulating, as a function of players' scores, the score award levels of a coin operated amusement game comprising:
    (a) memory means for storing data including:
        (i) a first memory location for permanently storing data relating to default values for award levels and award percentage;
        (ii) a second memory location for storing data relating to operator selected values for award levels and desired award percentage;
        (iii) a third memory location for temporarily storing selected portions of the default and operator selected values and historical data on players' scores;
        (iv) a fourth memory location for temporarily storing current game data;
    (b) input means for permitting operator selection of the values in said second memory location;
    (c) microprocessor means receiving the data relating to players' scores, award levels, award percentage and current game data from said third and fourth memory locations for periodically modifying the award level values to maintain either the default or the operator selected award percentage and giving player awards as earned;
    (d) means for communicating data between the microprocessor means, the memory means, the input means and for interfacing the system to game switches and displays;
    whereby as player skill increases the microprocessor means adjusts the award level values required to obtain an award.

2. A control system according to claim 1 wherein said input means are operator switches permitting operator communication with the microprocessor means to alter the data stored in said second memory location.

3. The system according to claim 1 wherein the microprocessor means includes means for verifying the integrity of the data before periodically modifying the award level values and for reverting to initial default or operator selected values for award levels and award percentage if the data is found to be faulty.

4. A control system for automatically regulating, as a function of players' scores, the score award levels of a coin operated amusement game comprising:
    (a) memory means for storing:
        (i) default values for award levels and award percentage;
        (ii) operator selected values for award levels and award percentage;
        (iii) historical data on players' scores;
        (iv) current game data;
    (b) input means for permitting operator selection and changing of the operator selected values;
    (c) microprocessor means receiving the data relating to players' scores, award levels, award percentage and current game data for perodically modifying the award level values to maintain either the default or operator selected award level percentage and giving player awards as earned;
    (d) means for communicating data between the microprocessor means, the memory means, the input means and for interfacing the system to game switches and displays;
    whereby as player skill increases the microprocessor means adjusts the award level values required to obtain an award.

5. The system according to claim 4 wherein the microprocessor means includes means for verifying the integrity of the data before periodically modifying the award level values and for reverting to initial default or operator selected values for award levels and award percentage if the data is found to be faulty.

6. A control system for automatically regulating, as a function of players' scores, the score award levels of an amusement game comprising:
    (a) memory means for storing:
        (i) data for award levels;

(ii) desired award percentage data;
(iii) game data, both current and historical;
(b) microprocessor means receiving the data stored in said memory means for periodically modifying the award level values to maintain said desired award percentage and giving player awards as earned;
(c) means for communicating data between the microprocessor means, the memory means, and for interfacing the system to game switches and displays;
whereby as player skill increases the microprocessor means adjusts the aware level values required to obtain an award.

7. The system of claim 6 wherein the microprocessor means includes means for:
    (a) computing an actual award percentage;
    (b) comparing the actual award percentage to the desired award percentage;
    (c) changing the award level data, if necessary, to maintain the actual award percentage approximately equal to the desired award percentage.

8. A method for automatically regulating, as a function of players' scores, the score award levels of an amusement game comprising the steps of:
    (a) storing in a computer memory:
        (i) data for award levels;
        (ii) desired award percentage;
        (iii) game data, both current and historical;
    (b) causing a computer to periodically modify the score award level values to maintain said desired award percentage and give player awards as earned;
    whereby as player skill increases the score award level values required to obtain an award are raised and with decreasing player skill the award level values are lowered.

9. The method of claim 8 wherein step (b) includes the substeps of:
    (a) computing an actual award percentage;
    (b) comparing the actual award percentage to the desired award percentage;
    (c) changing the score award level data, if necessary, to maintain the actual award percentage approximately equal to the desired award percentage.

* * * * *